United States Patent  
Ofek

Patent No.: US 6,477,627 B1  
Date of Patent: Nov. 5, 2002

(54) METHOD AND APPARATUS FOR MIRRORING DATA IN A REMOTE DATA STORAGE SYSTEM

(75) Inventor: Yuval Ofek, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/267,734

(22) Filed: Mar. 15, 1999

Related U.S. Application Data

(63) Continuation-in-part of application No. 08/657,760, filed on May 31, 1996, now Pat. No. 5,933,653.

(51) Int. Cl.[7] ............................................. G06F 12/02
(52) U.S. Cl. ........................ 711/162; 711/114; 709/234
(58) Field of Search .................................. 711/162, 161, 711/114; 709/234; 370/232

(56) References Cited

U.S. PATENT DOCUMENTS

| | | | | |
|---|---|---|---|---|
| 5,742,792 A | * | 4/1998 | Yanai et al. | 711/162 |
| 5,802,310 A | * | 9/1998 | Rajaraman | 370/232 |
| 5,987,566 A | * | 11/1999 | Vishlitzky et al. | 711/114 |
| 6,038,605 A | * | 3/2000 | Vishlitzky et al. | 709/234 |
| 6,173,377 B1 | * | 1/2001 | Yanai et al. | 711/162 |

\* cited by examiner

Primary Examiner—Matthew Kim  
Assistant Examiner—B. R. Peugh  
(74) Attorney, Agent, or Firm—George A. Herbster

(57) ABSTRACT

A data processing network including a local system and a geographically remote system. Each of the local and remote systems includes a data storage facility. The remote data storage facility mirrors the local data storage facility. In a normal operating mode, the local and remote systems operate in near synchronism or in synchronism. In an alternate operating mode, writing operations at the local system immediately update the storage devices in the local data storage facility. Transfers of corresponding data to the remote data storage facility are made independently of and asynchronously with respect to the operation of the local system.

11 Claims, 11 Drawing Sheets

METHOD AND APPARATUS FOR MIRRORING DATA IN A REMOTE DATA STORAGE SYSTEM

CROSS-REFERENCE TO RELATED APPLICATION

This application is a continuation-in-part of U.S. application Ser. No. 08/657,760 filed May 31, 1996 now U.S. Pat. No. 5,933,653, for a Method and Apparatus for Mirroring Data in a Remote Data Storage System which is assigned to the same assignee as this invention.

BACKGROUND OF THE INVENTION

1. Field of the Invention

This invention generally relates to digital data processing systems with a local data storage facility and one or more geographically remote data storage facilities that mirror the local data storage facility and more particularly to a method and apparatus for transferring data from the local to the remote data storage facility.

2. Description of Related Art

Computer implemented data base management systems are exemplary of systems that operate with what can become two antithetical considerations, namely: (1) maintaining the integrity of the data on the system and (2) maintaining maximum availability of the data on the system for maintenance, as by writing data to the system. In some prior art approaches backup operations preserve data integrity by copying the data to tape or other bulk storage media periodically; i.e., a "tape backup" operation. However, data maintenance operations for maintaining the data base were mutually exclusive with respect to tape backup operations. That is, no data maintenance or update operations could occur while the tape backup operation was in progress.

More recently disk redundancy has evolved as an alternative or complement to tape backup operations. Generally speaking, in a redundant system two storage devices, such as disk storage devices, store data in a form that enables the data to be recovered if one storage device becomes disabled. In a basic approach, a first disk storage device stores the data and a second disk storage device, at the same location, stores a mirror image of that data. Whenever a transfer is made to the first disk storage device, the data transfers to the second disk storage device essentially simultaneously. Typically separate controllers and paths interconnect the two disk storage devices to the remainder of the computer system.

More recently the concept of redundancy has come to include remote data facilities. A computer system with a remote data facility will include a first data processing system with disk storage facility at a local site and one or more duplicate data processing systems at one or more physically or geographically remote locations that operate with other data storage facilities as remote mirrors of the data in the local system. The geographical separation can be measured in any range between meters and hundreds or even thousands of kilometers.

Prior art systems using geographical remote data storage facilities for mirroring data storage facilities at a local site, such as a Symmetrix remote data facility manufactured by the assignee of the present invention, maintains synchronism between the data stored at the local site in a local volume with the data located in the mirror on a target volume. In one operating mode each writing operation from a host, that may contain a single writing command or a sequence of writing commands depending upon the nature of the system, transfer data to the data storage facility at the local site and to the remote site. In one variation no additional data writing operations can occur until this acknowledgment is received. In another, operations other than writing operations may occur; a successive writing operation to that volume will be held in suspension pending acknowledgement of a prior writing operation. With this approach, the local and remote storage facilities will be in complete synchronism or at most, to within one writing operation of synchronism on a volume-by-volume basis. This provides maximum protection because under any scenario only minimal data loss is possible should some catastrophic failure occur at one or the other sites or in any communications link therebetween.

In many applications writing operations are evenly distributed in time and constitute less than a major proportion of the operations. The delays encountered in transferring data from the local to the remote site and awaiting the return of an acknowledgement do not affect the overall operation of the system. However, there are two basic types of operations in which these methods do not provide completely satisfactory results. One involves bursts of writing operations; the other block transfers to the remote data facility. Writing bursts can occur particularly during data transfers resulting from a data reorganization or during the execution of some batch programs. In such situations writing operations can constitute a significant portion of the total number of transactions between the data processing system and the local data storage facility.

Block transfers can occur during an original installation of a remote data facility and other tasks. There are some prior art alternatives for making block transfers to the remote data storage facility. The first is to make a tape backup of the data at the local site for transport to the remote site. The alternative is to copy the entire disk directly to the remote site over the interconnecting communications link. Either approach requires termination of any normal operations at the local site. Another alternative is merely to allow the standard normal writing operations to eventually synchronize the remote site. This is not advantageous because completion of any such transfer requires a writing operation to each and every position on the local disk whether or not it needs to be changed in order to affect a complete copying and synchronization.

As will be apparent each of the foregoing conditions can be unacceptable when the data base stored at the local site must be available on a continuous basis. Bursts of writing operations can introduce significant delays and affect the response of a data processing system connected to the local data storage facility. The transfer of large blocks of data can have the adverse affect of shutting down the system for an intolerable interval. If the blocks are made smaller to minimize any delay interval, the time required to transfer the data and synchronize the system becomes longer and may also become unacceptable.

SUMMARY

Therefore, it is an object of this invention to provide a method and apparatus for transferring data from one data storage facility to a mirroring data storage facility at a geographically remote location.

Another object of this invention is to provide a method and apparatus for transferring data from a data storage facility at a local site to a data storage facility at a geographically remote location during sequences of repetitive writing operations.

Still another object of this invention is to provide a method and apparatus for transferring data from a data storage facility at a local site to a storage facility at a geographically remote site when the remote site is being added to the data processing system.

Still yet another object of this invention is to provide a method and apparatus for transferring of data from a data storage facility at a local site to a data storage facility at a geographical remote location that can operate with controls that enable the systems to operate out of synchronism.

In accordance with one aspect of this invention, a data processing network includes a first data storage facility, a geographically remote second data storage facility and a communications link that enable transfers therebetween. Each data storage facility includes a data store, typically one or more disk storage devices, and a buffer memory for temporarily storing data whereby data transfers from the buffer memory to the data store. The first data storage facility includes a host connection that provides a path to a host data processor. During a writing operation the host data processor effects a transfer of data to the buffer memory. The first and second data storage facilities receive that data in accordance with a normal operating mode. In accordance with this invention that normal operating mode can be disabled thereby enabling the operation of an alternate operating mode wherein data transfers from the host processor connection transfer to the buffer memory in the first data storage facility and from the buffer memory to the data store therein. The system then transfers an acknowledgement signal indicating the successful transfer of the data to the host processor. The transfer from the first to the second data storage facility then occurs asynchronously and independently of the operation of the first data storage facility and the host processor.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
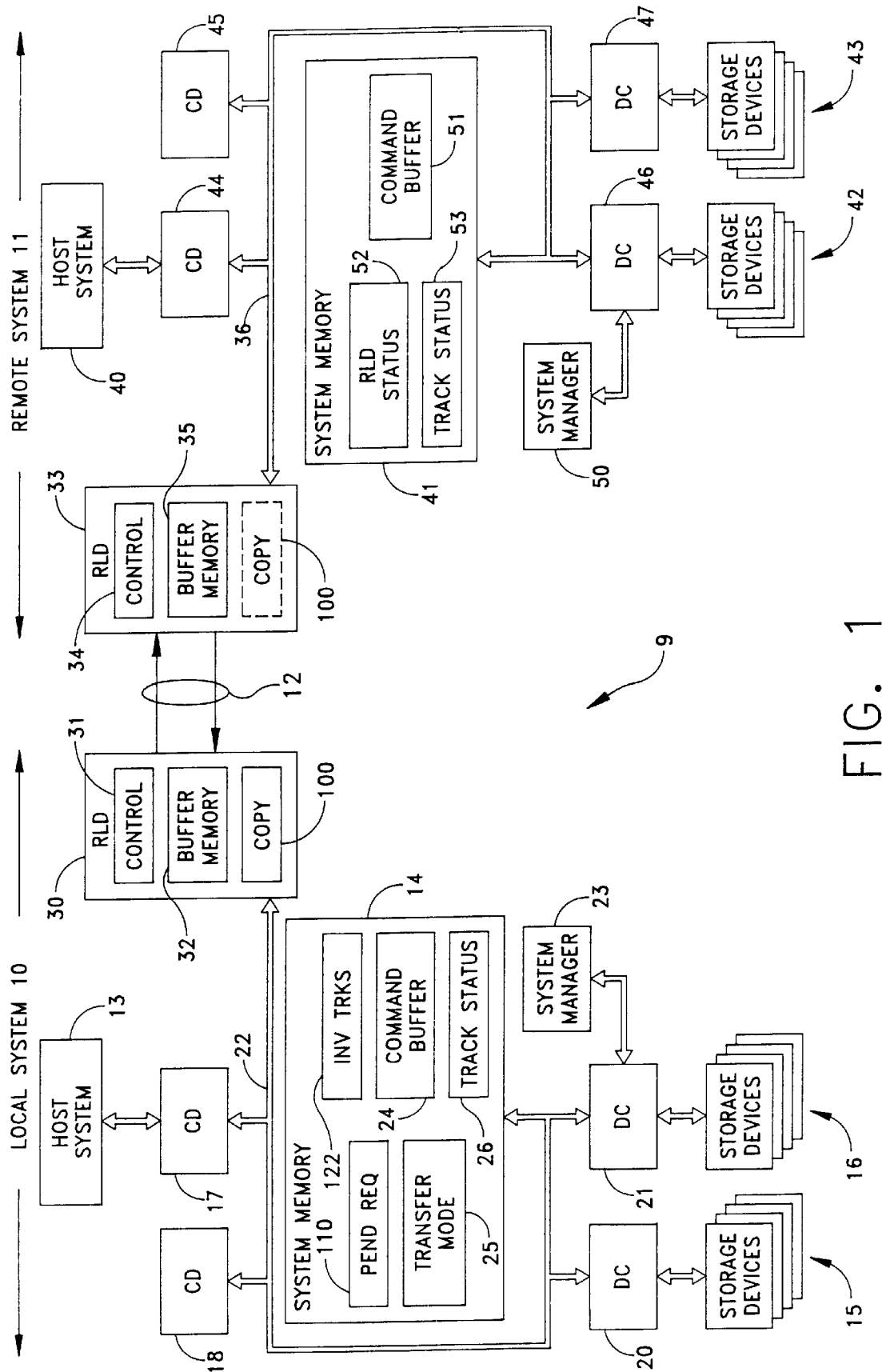
FIG. 1 is a block diagram of a data processing network constructed in accordance with this invention.

FIG. 1 depicts a data processing network 9 comprising two essentially identical data processing systems that include a local system 10 and a geographically remote system 11. A communications link 12, comprising fiber optic cables or high-speed data transmission lines, interconnects the local system 10 and remote system 11. The physical separation between the local system 10 and the remote system 11 can be up to hundreds of kilometers or more.

The local system 10 comprises, as major components, a host system 13 with a host processor and a first data storage facility with a system memory 14 and sets 15 and 16 of multiple data storage devices or data stores. The system memory 14 can comprise a buffer or cache memory; the storage devices in the pluralities 15 and 16 can comprise disk storage devices, optical storage devices and the like. The sets 15 and 16 represent an array of storage devices in any of a variety of known configurations.

A channel director (CD) 17 provides communications between the host system 13 and the system memory 14; device controllers (DC) 20 and 21 provide pathways between the system memory 14 and the storage device pluralities 15 and 16. A bus 22 interconnects the system memory 14, the channel directors 17 and 18 and the device controllers 20 and 21. A system manager 23 enables an operator to transfer information between the various elements of the system, such as a command buffer 24, TRANSFER MODE block 25 and a TRACK STATUS block 26 through one of the device controllers, namely the device controller 21 in FIG. 1. Bus access logic, not shown but known in the art, controls transfers over the bus.

Generally speaking, the local system 10 operates in response to commands from one or more host systems, such as the host system 13. A connected channel director, such as channel director 17, receives those commands and translates them into requests, such as write requests. The channel directors 17 and 18 transfer these requests to the system memory 14 in locations, such as the command buffer 24. The device controllers, such as the device controller 20 or 21, respond to requests in the command buffer by effecting a corresponding operation. The selected device controller then initiates a data operation. Reading operations transfer data from the storage devices to the system memory 14 through a corresponding device controller and subsequently transfer data from the system memory 14 to the corresponding channel director, such as channel director 17.

The local system 10 in FIG. 1 additionally includes a remote link director (RLD) 30 for controlling transfers of data between the local system 10 and the remote system 11 over the communications link 12. The major components of the remote link director 30 include a control 31 and a buffer memory 32. The remote link director 30 connects to the system bus 22 and the communications link 12.

The remote system 11 includes a remote link director 33 that connects to the communications link 12 and includes a control 34 and a buffer memory 35. Signals received from the remote link director 33 transfer over a system bus 36, like the system bus 22, of the remote system 11. The remote system 11, like the local system 10, includes, as its major components, a host system 40, a system memory 41 and storage device sets or data stores 42 and 43. The sets 42 and 43 represent an array of storage devices configured to mirror the sets 15 and 16. In the same fashion as in the local system 10, the remote system 11 includes channel directors 44 and 45 for connection to host systems. In this particular embodiment, the host system 40 connects to the bus 36 through the channel director 44. Device controllers 46 and 47 provide pathways between the system bus 36 and the storage device sets 42 and 43 respectively. A system manager 50 enables an operator to transfer information between the various elements of the system, such as a command buffer 51, RLD STATUS block 52 and a TRACK STATUS block 53 that are described in more detail later. Bus access logic, not shown but known in the art, controls transfers over this bus.

Each of the local and remote systems 10 and 11 may comprise a Symmetrix integrated cached disk array as manufactured and sold by the assignee of this invention according to known operations as described in Yanai et al., U.S. Pat. No. 5,206,939 issued Apr. 27, 1993. Consequently, the following discussion makes only general references to general operation of such systems. For purposes of this invention it is sufficient to understand that the remote system 11 normally acts as a mirror of the local system 10 on a volume-by-volume basis and that the volume can be a physical volume, although a logical volume is a preferred division. Given the geographical separation between the local and remote systems 10 and 11, the system in FIG. 1 operates with an extremely high degree of reliability, even in the event of a natural disaster. In such systems transfers from the local system 10 to the remote system 11 normally occur in response to a writing command issued by a local host system such as the host system 13. The details of such a transfer are discussed later.

The host system 40, in such an environment, could be limited to performing read operations in order that the remote system 11 exactly mirror the local system 10. Should some catastrophic event prevent any part of the local system 10 from operating, control can be transferred to the remote system 11 through use of the system manager 50 that would disconnect the remote link director 33 and enable the host system 40 to read and write data to the storage device sets 42 and 43. Mirroring remote data facilities are also known in the art; and Symmetrix remote data facilities supplied by the assignee of this invention provide such remote mirroring capabilities.

With this as background, it will now be possible to describe the various operations of these components during normal mirroring modes and during each of two alternate operating modes.

Normal Mirroring Mode

In a normal operating mode the local system 10 is the active system while the remote system 11 functions solely as a mirror. For example, when the system in FIG. 1 accommodates a database, the local system 10 processes all the OLTP applications including those that can effect changes to the data base. For purposes of this description, it is assumed that the host system 13 issues a Channel Control Word (CCW) command including all the necessary parameters from which the system can transfer a data block to or from a particular location in the storage device sets 15 and 16. Other operating systems use other procedures, and this invention is readily adapted to operate with such systems.

Figure 2A:
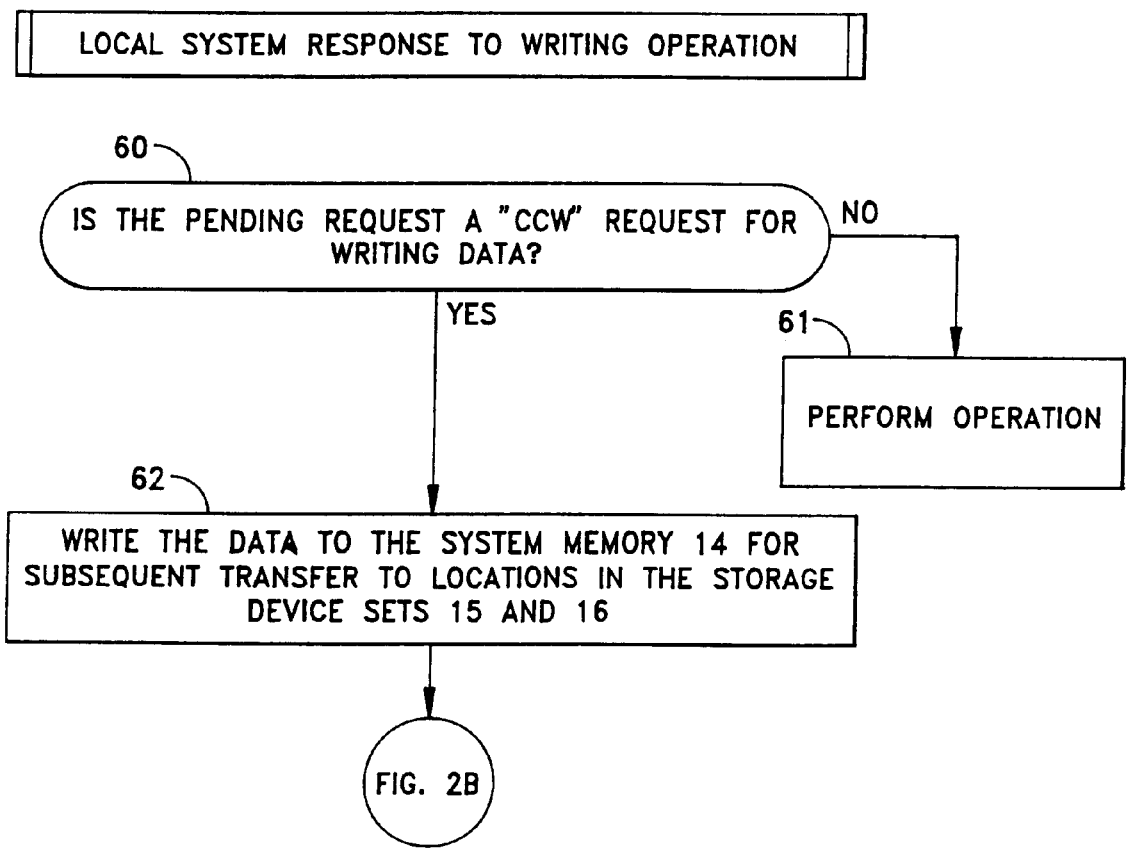
FIGS. 2A through 2E are flow diagrams that are useful in understanding the operation of the data processing network shown in FIG. 1.

When a host system such as the host system 13 in FIG. 1 issues a command, it transfers the CCW command or equivalent to the channel director 17 that responds by generating a write request for transfer to the system memory 14. If the system memory control 24 determines that the pending CCW command will perform an operation other than a writing operation for transferring data to a location in one of the storage device sets 15 or 16, step 60 of FIG. 2A diverts to perform the requested operation in step 61. If the CCW request defines a write operation, control transfers from step 60 to step 62 wherein the information comprising the write request and data to be written are stored into a buffer memory in the system memory 14 for subsequent transfer to locations in the storage device sets 15 and 16 in a normal fashion. This operation is also called a destaging operation.

During normal mirroring operations, the RLD STATUS block 25 indicates an ONGOING status because the remote system 11 connects to the local system 10 through the remote link directors 30 and 33 and the communications link 12 and because the local system 10 and remote system 11 are synchronized. Under these conditions control transfers from step 62 in FIG. 2A to step 64 in FIG. 2B. Step 64 determines whether the system is operating in a "SYNC" operating mode that constitutes one of two normal operating modes. In this operating mode, a channel director, such as the channel director 17 in FIG. 1, generates a write request for the remote system 11 in step 65. This involves loading the data and a write request into the system memory 14 for transfer to an appropriate one of the pluralities of storage devices 42 and 43. This also could be accomplished simultaneously or in conjunction with step 62.

As will become apparent later, the alternate operating mode can be implemented with either of two procedures and that the alternate operating mode can be controlled so it operates only under certain conditions or constraints. The first is an "ADAPTIVE COPY-WRITE PENDING" procedure. Step 66 determines whether this procedure was being processed and interrupted to return to the SYNC operating mode. If it was, step 67 determines whether the number of write requests pending for the remote system are above a maximum. If they are not, system operation advances to FIG. 2D and returns to the ADAPTIVE COPY-WRITE PENDING operating mode. Otherwise the system transfers to await an acknowledgement signal in step 70. The other alternating operating mode is an "ADAPTIVE COPY-DISK" operating mode. Step 71 determines whether the requested SYNC operation has been initiated by interrupting such an ADAPTIVE COPY-DISK operating mode. If it has, the system tests the number of invalid tracks listed in the TRACK STATUS table 26 of FIG. 1. If the number of marked tracks are above a maximum, step 72 transfers to step 70. Otherwise control transfers to the steps in FIG. 2E and returns the operations to the ADAPTIVE COPY-DISK operating mode.

In the SYNC mode no succeeding operation involving a given logical volume or other memory division will occur unless the prior writing operation to that logical volume or division has been acknowledged within a predetermined time interval. Steps 70 and 73 act together to monitor the network for a timely return of an acknowledgement from the remote system 11 within the predetermined time interval. If no such acknowledgement is received, an error condition exists and the RLD 30 generates a UNIT CHECK message in step 74. Whether the acknowledgment is received or not, the initiating channel director, such as channel director 17, sends a CE, or Channel End, signal to the host system 13 in step 75. If this is the first or an intermediate CCW command in a sequence, step 76 transfers control to step 77 to send a DE, or Device End, signal to the host system 13. After processing the last CCW command in a sequence step 76 diverts to step 80 to test for any error conditions. If no error has occurred, the channel director 17 uses step 77 to send the DE signal to the host system 13. If an error has occurred, control passes to step 81 to transfer the DE signal with a message identifying the nature of the error.

Simultaneously with the foregoing operation, one of the device controllers, such as device controller 20 or 21, at the local system, responds to the write request by transferring the written data from the system memory 14 to an appropriate location in one of the pluralities of storage devices 15 and 16. Step 82 indicates this procedure.

Figure 2B:
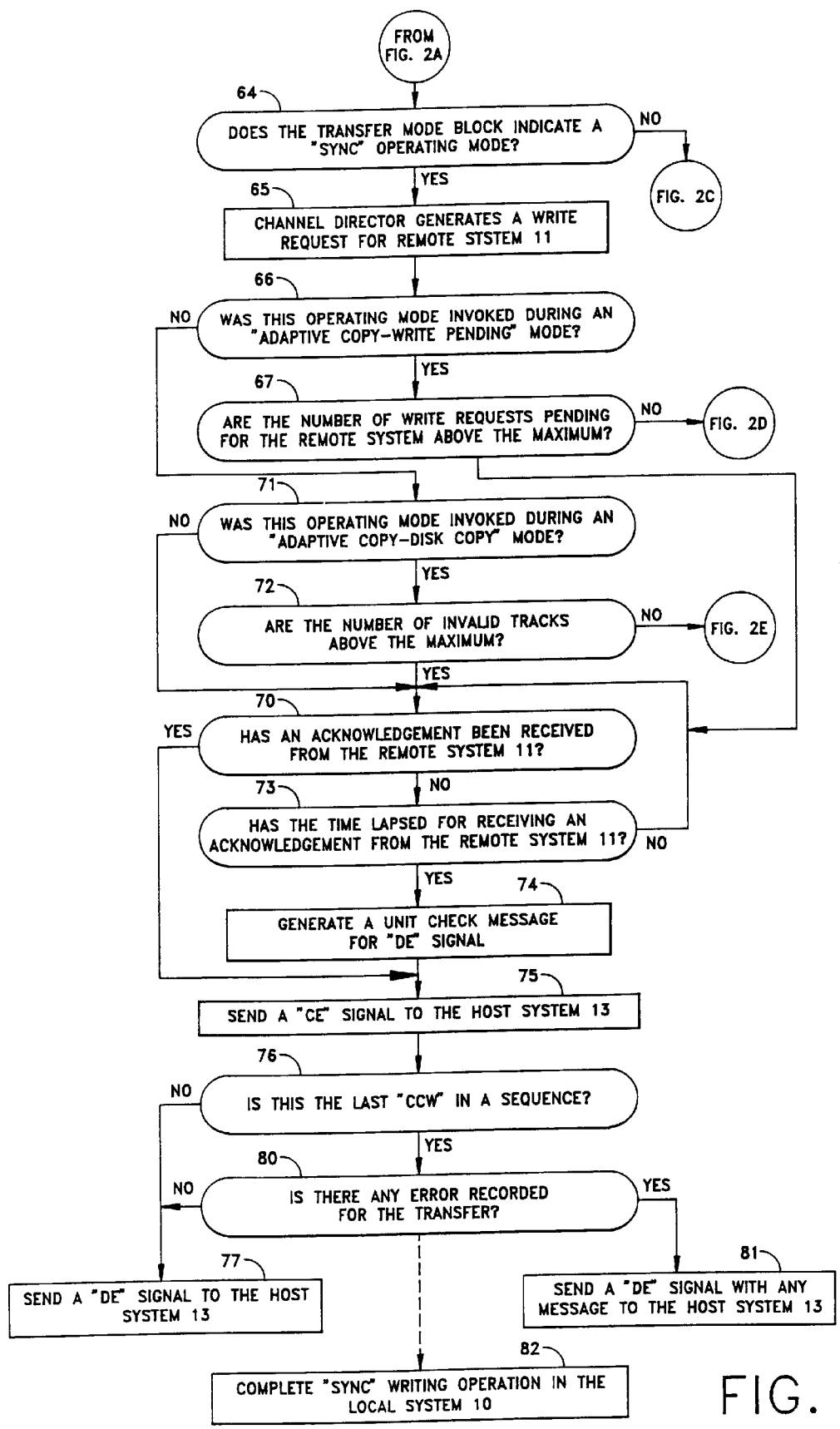
Figure 2C:
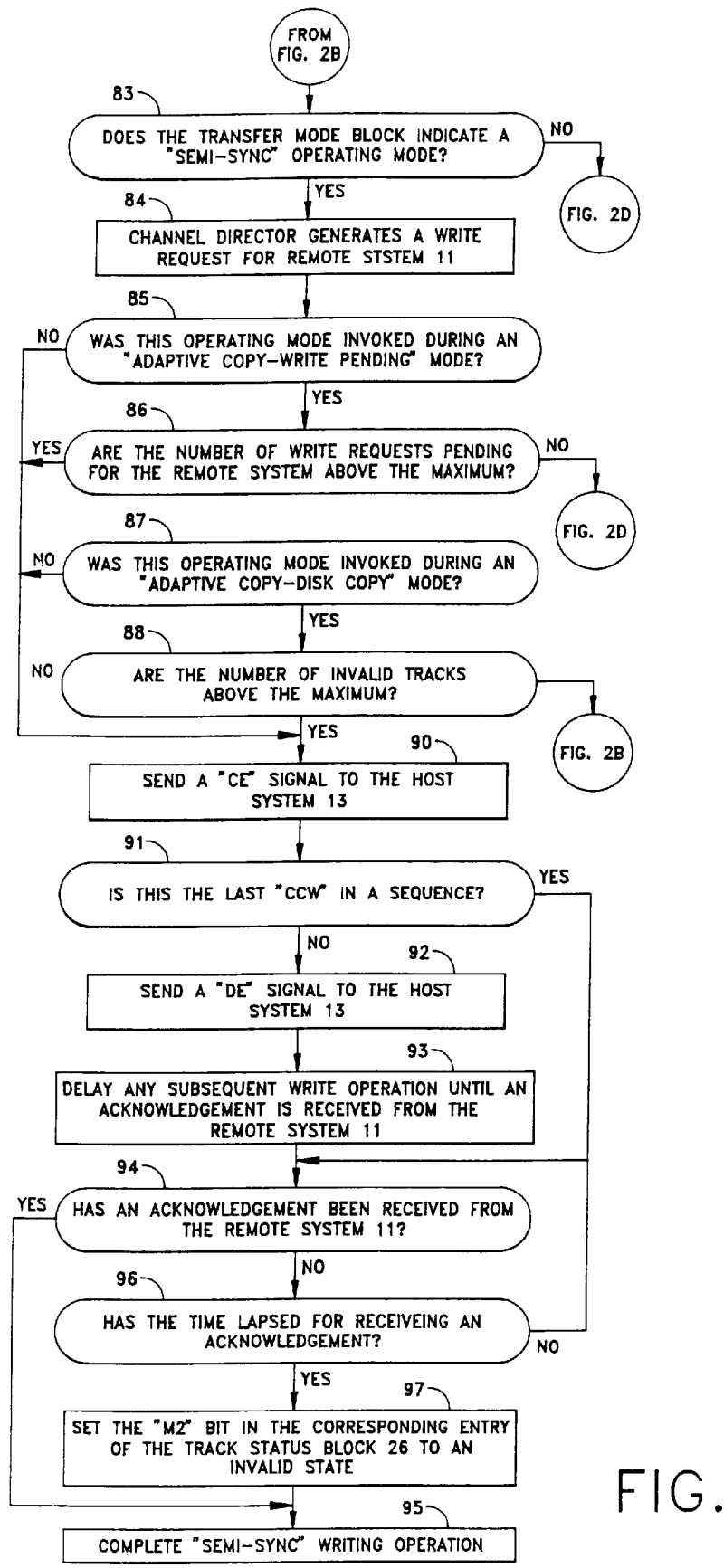

If the network shown in FIG. 1 is operating in a "SEMI-SYNC" operating mode, step 64 in FIG. 2B diverts to step 83 in FIG. 2C. Step 83 in FIG. 2C then diverts to step 84 whereupon the channel director generates the write request that transfers to the system memory 14 for transfer to locations in the storage devices 15 and 16 and in the storage devices 42 and 43. A series of steps 85, 86, 87 and 88 perform the same function as steps 66, 67, 71 and 72 in FIG. 2B. Generally, these steps determine whether the system is operating in the SEMI-SYNC operating mode after interrupting either of the ADAPTIVE COPY, WRITE-PENDING or ADAPTIVE COPY-DISK operating modes and determining whether the procedure should revert to those modes.

Figure 3:
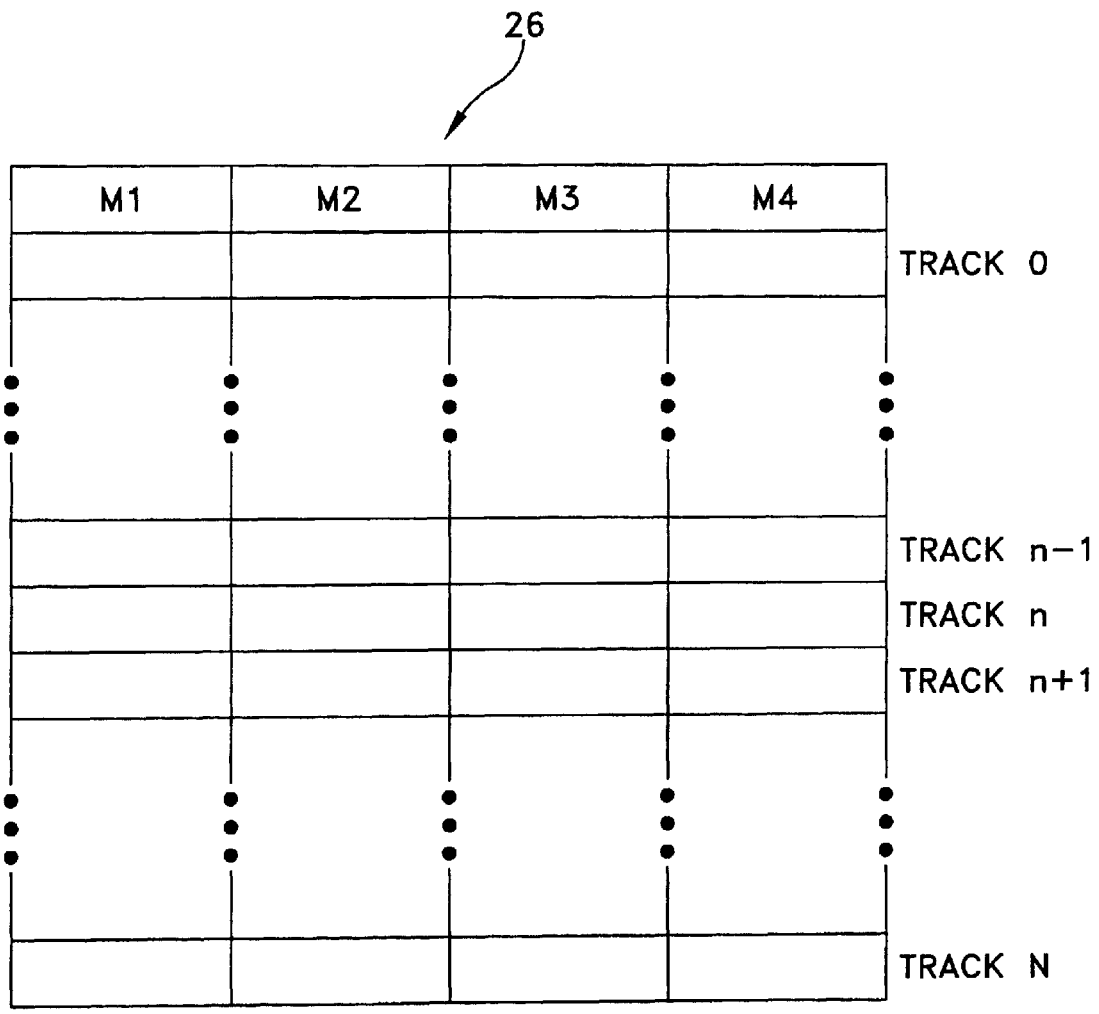
FIG. 3 depicts the organization of a track status table shown in FIG. 1.

Assuming the system is operating in a normal operating mode, control passes to step 90 where the channel director 17 responds to the transfer of the write request to the system memory 14 by transferring the CE signal to the host system 13. As in the SYNC operating mode, steps 91 and 92 perform analogous functions to steps 75 and 76 by sending the DE signal to the host system 13 until the last CCW in a sequence is processed. In this variation, the host system 13 can perform. other disk operations. If the channel director 17 issues a second write request before the remote system returns an acknowledgment for the prior write request, the local system effectively disconnects and returns a non-immediate retry message. When the acknowledgement is received, the local system 10 reconnects through the channel director and processes the second write request on a retry. This "delay" procedure is designated by step 93. When an acknowledgment is received from the remote system 11, step 94 diverts to step 95 whereby the SEMI-SYNC writing operation is completed. If, however, no acknowledgment signal is received in a predetermined time, established by step 96, step 96 diverts to step 97 whereupon the M2 bit in the corresponding entry of the TRACK STATUS block 26, as shown in FIGS. 1 and 3, is set to an invalid state.

Consequently during the normal operating mode any change the host system 13 makes to the data in the storage device sets 15 and 16 automatically produces a corresponding change in the mirroring storage device sets 42 and 43. Moreover in normal operation the storage device sets 42 and 43 or logical volumes therein exactly mirror the corresponding ones of the storage device sets 15 and 16 or logical volumes therein according to configuration information from the system manager 23 and system manager 50.

It will be helpful to describe the structure and operation of the TRACK STATUS block 26 in FIG. 1. FIG. 3 represents the TRACK STATUS block 26 as a matrix in which each row identifies a track in the storage device sets 15 and 16 and in the sets 42 and 43. In FIG. 3 the columns are headed by M1, M2, M3 and M4 that establish correspondences between each column position and the local or remote system.

It will be apparent that each entry in the block 26 corresponds to a data block of a minimum transfer size. In Symmetrix systems this is typically a track; however, in other systems a given track might be divided into multiple blocks or a block might even comprise multiple contiguous tracks. Such variations only change the organization of the TRACK STATUS block 26 by increasing or decreasing the number of rows in the TRACK STATUS block 26. Each row will correspond to one data block.

In a system as shown FIG. 1 with one mirror, only the data columns identified as the M1 and M2 columns contain relevant TRACK STATUS data. For any given track the M1 column in FIG. 3 indicates whether the data in the corresponding track in the local system 10 is valid while the M2 column indicates whether the data in the corresponding track in the remote system 11 is valid. In an implementation involving two additional remote systems, the M3 and M4 columns in FIG. 2 would indicate the whether the data in the corresponding tracks in the remaining two mirrored systems were valid. Typically and for purposes of this discussion, a "0" indicates a valid data track or block; a "1", an invalid data track or block.

Consequently in the SEMI-SYNC operating mode shown in FIG. 2C, the failure to produce an appropriate transfer within a predetermined time interval causes the local system to set its corresponding TRACK STATUS bit for the corresponding track in the remote system to an invalid state. Thereafter a copy program 100 that, when enabled, monitors the TRACK STATUS will transfer the corresponding track from one of the storage devices 15 and 16 to the corresponding track location of the storage devices 42 and 43.

Thus, as known, in the SYNC operating mode, the system memory 14 receives and retains a write request and corresponding data until the transfer is complete to the data stores, as the pluralities 15 and 16 and the pluralities 42 and 43 of the storage devices until receiving an acknowledgment that both write requests have been destaged. In this mode all further transfers or operations with the corresponding volume or division through the requesting channel director are blocked. During SEMI-SYNC mode operations the system memory 14 retains a write request and data only until the transfer is made to the appropriate one of the pluralities 15 and 16 of the storage devices and is properly transferred to the remote system 11 within the predetermined time. If not, the system memory 14 no longer retains that data and the track to which the data has been transferred must be copied to the remote system 11.

In accordance with this invention, the system operator can use the system manager 23 to establish one of two previously described adaptive copy operating modes, namely: an ADAPTIVE COPY-WRITE PENDING operating mode or the ADAPTIVE COPY-DISK operating mode. If the data network 9 for any logical volume is operating in either of these modes, steps 64 in FIG. 2B and steps 83 in FIG. 2C divert to step 101 in FIG. 2D.

ADAPTIVE COPY-WRITE PENDING

Operating Mode

Figure 2D:
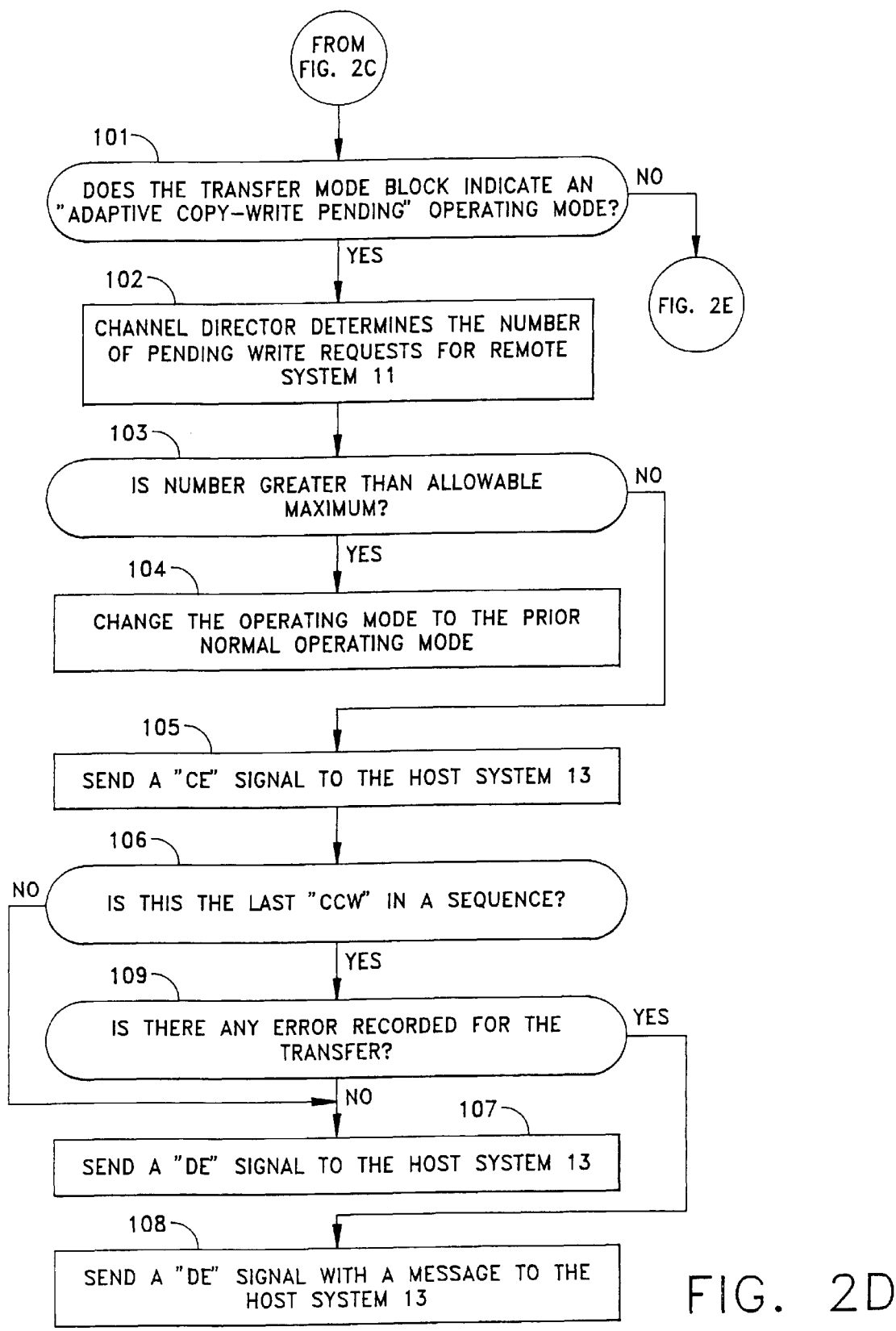

If the ADAPTIVE COPY-WRITE PENDING operating mode has been selected, step 101 in FIG. 2D diverts to step 102 wherein the channel director handling a write request determines the number of pending write requests for transfer to the logical volume or other division in the remote system 11. If that number is greater than an allowable maximum, step 103 diverts to step 104 that changes the operating mode to the prior normal operating mode; namely, either the operating mode of FIG. 2B or the operating mode of FIG. 2C as previously indicated. Otherwise the channel director, such as the channel director 17, sends the CE signal to the host system in step 105, determines if it is processing the last "CCW" in a sequence in step 106 and then completes the operation by either sending a DE signal in step 107 or a DE signal with a message in step 108 where the message indicates an error that is monitored in step 109.

Figure 4:
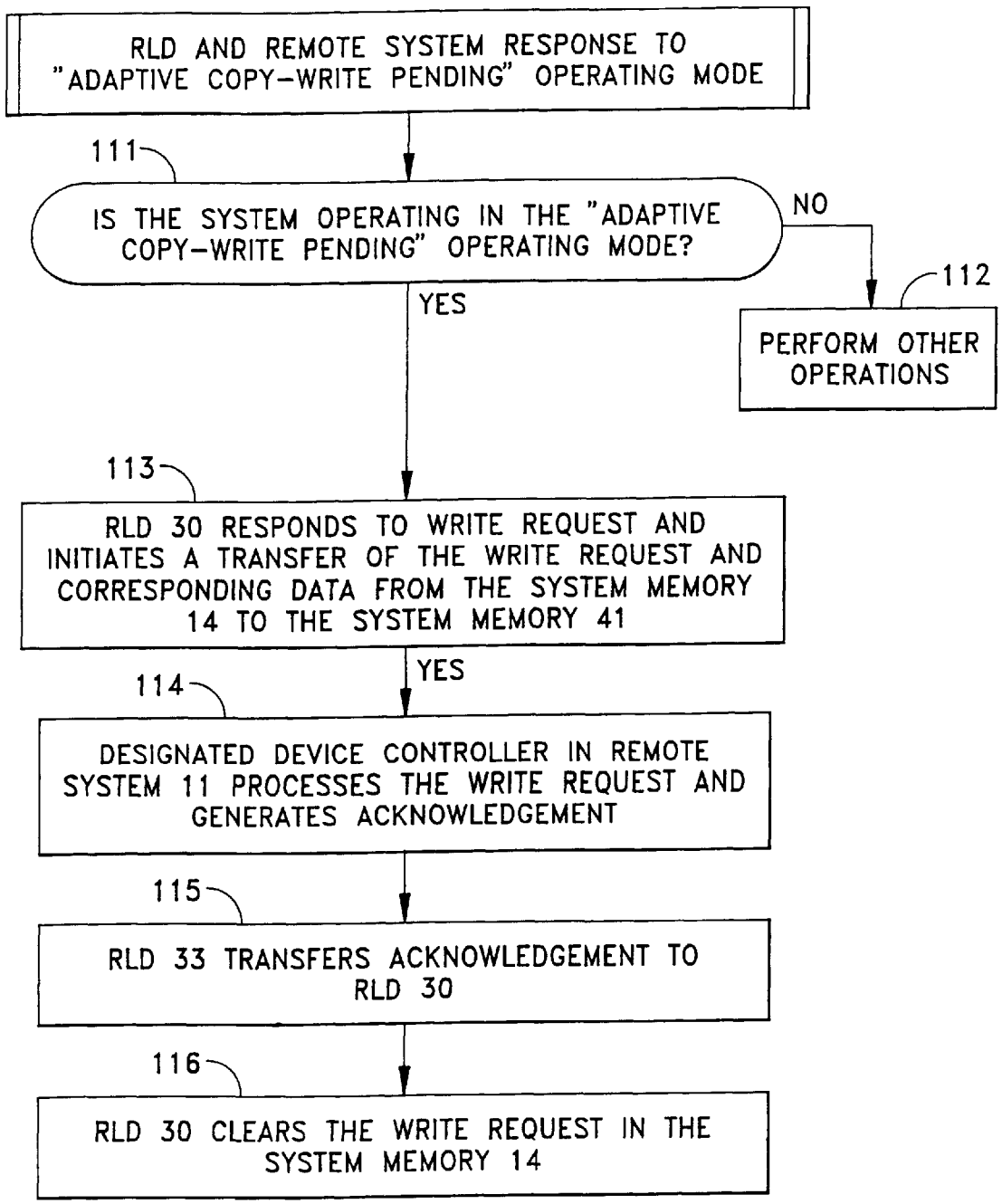
FIG. 4 is another flow diagram that is useful in understanding this invention.

FIG. 4 depicts the RLD and remote system response to a write request during the ADAPTIVE COPY-WRITE PENDING operating mode. Particularly, step 111 in FIG. 4 diverts to step 112 if some other operation has been required. In step 113 the RLD 30 retrieves the write request from the buffer memory in the system memory 14 and initiates a transfer of the write request and corresponding data to the system memory 41 in FIG. 1. The designated device controller in the remote system 11 destages that write request and generates an acknowledgment in step 114. The RLD 33 transfers that acknowledgement to the RLD 30 in step 115. The RLD 30 then clears the write request in the system memory 14 in step 116. Consequently at the end of each such operation one write request that had been previously transferred into the system memory 14 has destaged to the remote system 11 independently of subsequent operations in the local system 10.

As will be apparent, in this mode data transfers from the local system 10 to the remote system 11 but the local system 10 does not wait for the receipt of any acknowledgment or synchronization from the remote system 11. This mode is especially useful when a large amount of data must be transferred to remote devices and performance must not be compromised at the host system 13 or when it is not necessary for the remotely mirrored volumes to be synchronized at all times. Essentially in this operating mode the data in the remote system 11 remains as current to the data in the local system 10 as possible and as determined by the maximum number of requests pending in the command buffer 24.

As previously indicated in some situations it may be desirable to limit the number of write requests that accumulate in this operating mode. To this end the system memory 14 includes a PEND REQ table 110 into which the system manager 23 transfers the number of permissible write requests to the remote system 11 that can remain pending. This indicates the amount by which the two systems can be out of synchronism. Until this limit is reached the local system 10 informs the host system 13 of each of a successful write operation immediately upon transferring the data into the system memory 14. The local system 10 then operates to destage the data into the appropriate one of the local storage devices 15 and 16. The RLD 30 subsequently transfers the data to the system memory 41 in the remote system 14 via the communications link and RLD 33. This data transfer occurs while the local system 10 continues to process subsequent input/output commands through the same channel director and even to the same logical volume or division.

If a burst of writing operations occur and write requests accumulate in the system memory 14 until they reach the maximum, operations revert to the prior normal operating mode as previously indicated. While the write requests remain below the maximum, they remain in the local system memory 14 until the transfer of each to the remote system 11 is complete. The system manager 23 can fine tune the value in the PEND REQ table 110. That table can contain entries for each logical volume or other division in the network. Each channel director, such as the channel director 17, monitors the value of the number of pending requests for a given volume against corresponding entries in the PEND REQ table 110.

ADAPTIVE COPY-DISK

Operating Mode

Figure 2E:
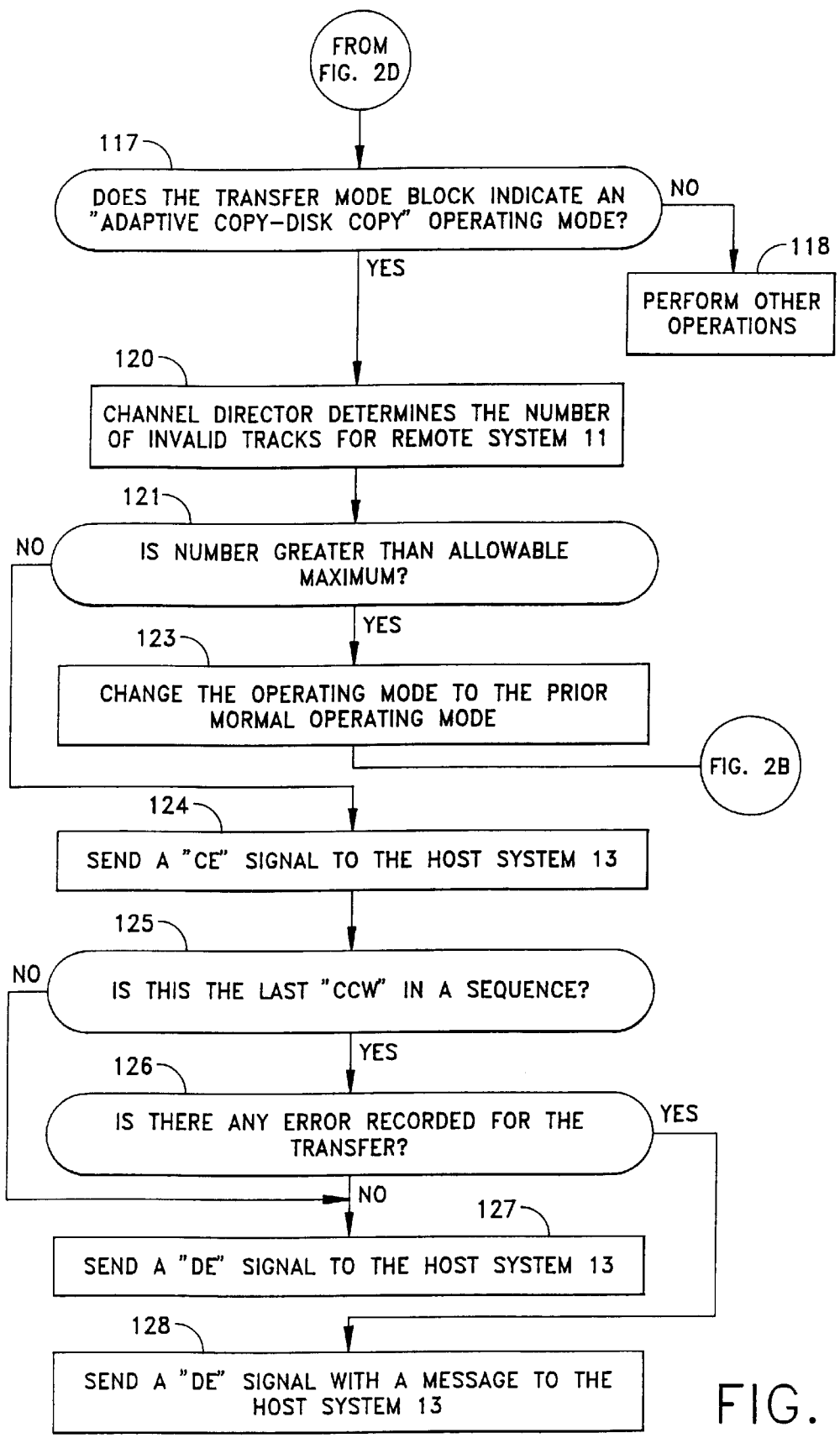

The other alternate operating mode is the ADAPTIVE COPY-DISK operating mode depicted in FIG. 2E. In the organization of FIGS. 2A through 2E, step 101 in FIG. 2D diverts to step 117 in FIG. 2E to establish this operating mode. If still some other operation is designated control passes to step 118 that, for example, could include an error procedure indicative of an illegal command. In this operating mode the channel director determines the number of invalid tracks for the remote system 11 in step 120. More specifically, the channel director, such as the channel director 17, looks at the number of bits set in the TRACK STATUS register 26. If that number is greater than an allowable maximum, contained in an INV TRKS table 122 in FIG. 1, step 121 diverts to step 123 where, in a fashion analogous to that shown in FIG. 2D, the system transfers to FIG. 2B or FIG. 2C depending upon the prior normal operating mode. When the number of invalid bits in the TRACK STATUS register 26 is less than the maximum in the INV TRKS table 122, step 121 diverts to step 124 whereupon the channel director begins a sequence to send the CE and DE signals to the host system 13. More specifically steps 124, 125, 126, 127 and 128 operate in a fashion that is analogous to the operations in similar steps shown in FIGS. 2B, 2C and 2D.

As with the PEND REQ table 110, the INV TRKS table 122 can actually constitute a register corresponding to each logical volume in the system to provide control on a logical-volume-by-logical-volume-basis or corresponding to other divisions of the data storage facilities as may be appropriate.

This mode is particularly adapted for situations when large amounts of data must be transferred to a remote system and has little impact on the performance between a host system 13 and the local data storage facility. This mode keeps the data in the remote system 11 as current to the data in the local system 10 as possible. Again in a manner similar to that shown in FIG. 2D, the ADAPTIVE COPY-DISK operating mode enables the local system 10 to acknowledge all write operations as if they were local volumes. In this case, however, the data is not retained in the system memory 14 after it is destaged to the data stores in the local system 10.

Figure 5:
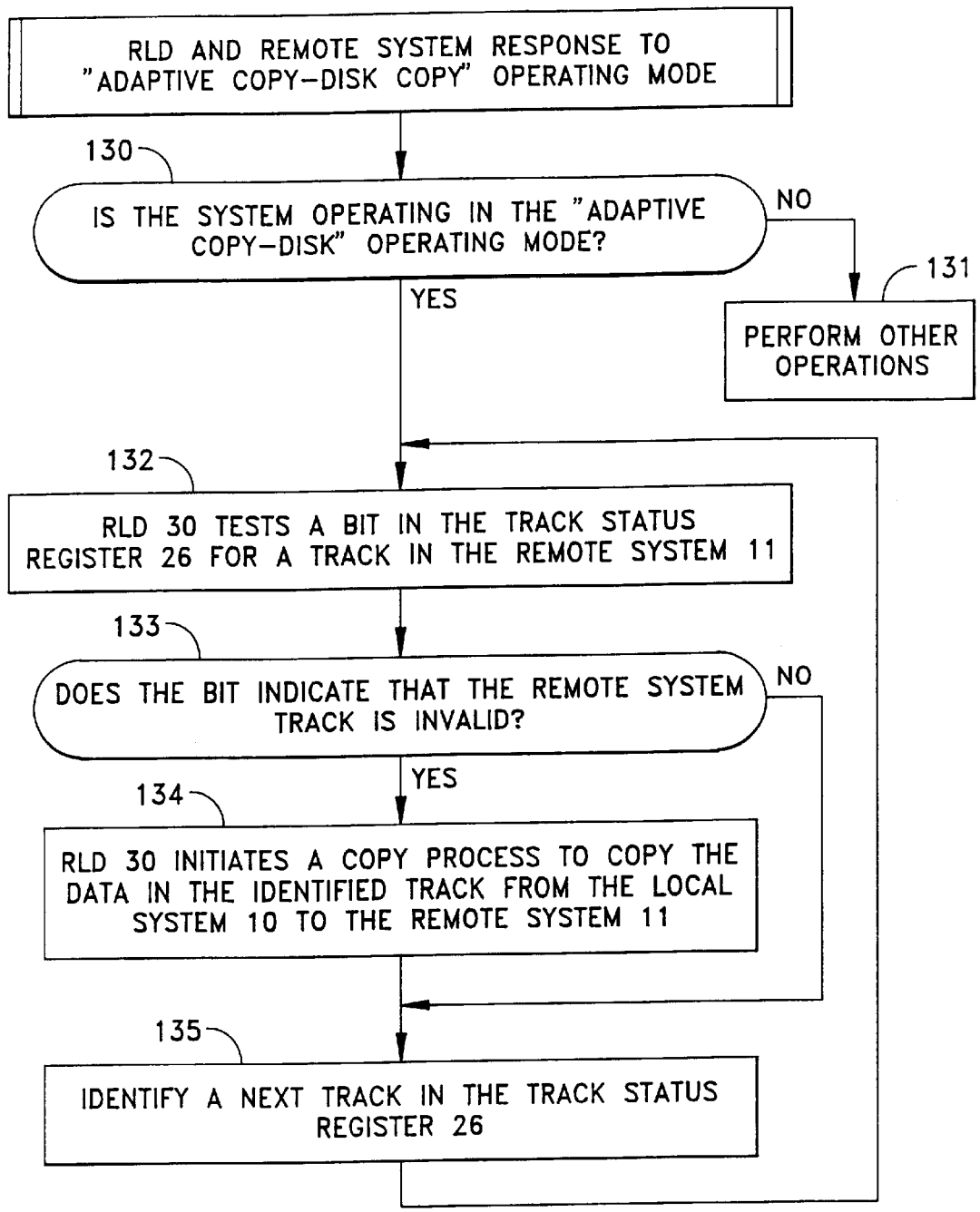
FIG. 5 is another flow diagram that is useful in understanding this invention.

As shown in FIG. 5, the RLD 30 uses step 130 to transfer to step 131 if the system is operating in an ADAPTIVE COPY-DISK operating mode. If it is not, control transfers to step 131 that determines whether another appropriate operation is necessary. In step 132 the RLD 30 tests a bit in the TRACK STATUS register 26 and particularly for a track in the M2 column shown in FIG. 3, to determine whether the track in the remote system is valid. If it is invalid and the corresponding track in the local system 10 is valid, step 133 transfers to step 134 whereupon the RLD 30 initiates the copy process 100 to transfer the data in the identified track from the local system 10 to the remote system 11. The RLD 30 then uses step 135 to identify a next track in the TRACK STATUS register 26 and returns to step 132. If a particular bit is valid, step 133 transfers control to step 135 to identify a next track in the TRACK STATUS register 26.

This operating mode continues until the system manager 23 returns operations to the normal operating mode or until the number of invalid tracks, or "skew", exceeds a predetermined number in the INV TRKS table 122 assigned to the logical volume or other division. As previously indicated, exceeding the maximum causes step 121 in FIG. 2E to divert to step 123 to return to the normal operating mode. Thereafter the systems 10 and 11 will destage each subsequent write request according to the SYNC or SEMI-SYNC operating modes. However, the copy program 100 will continue to operate, albeit with less priority with respect to the subsequent destaging operations. If a burst, for example, produces the excessive number of invalid tracks, at the end of the burst copy program 100 will begin to transfer data tracks at a faster rate and eventually reduce the number of invalidated tracks below the maximum. When that happens, the ADAPTIVE COPY-DISK operating mode is reestablished as shown in FIGS. 2B and 2C.

Therefore in accordance with this invention there have been disclosed two asynchronous procedures by which data can be effectively transferred to a remote data facility operating as a mirror independently of operations between a host processor and a local system. In both approaches write requests are immediately processed for storage at the local system. In one alternative the write requests are transferred to the remote system for destaging independently and asynchronously of subsequent operations in the local system 10. The total number of pending write requests for transfer to the remote system 11 is then handled. Monitoring the total population of such requests against some maximum number enables control over the skew or lack of synchronism that may result. In the alternative, the local system merely destages the write request and indicates that the corresponding track in the remote system no longer contains valid data. A copy program, in an orderly fashion, identifies each track containing valid data in the local system and invalid data in the remote system and copies that track to the remote system.

Each procedure or alternative has certain advantages for particular applications and can be utilized interchangeably. As will also be apparent and as previously indicated, these alternative operating modes can be applied on a volume-by-volume basis. It will also be apparent that many variations and modifications may be made to the invention as disclosed without departing from the true spirit and scope of this invention. For example, a particular embodiment may include only one of the two alternative operating modes. Still other alternative operating modes might be incorporated in a system. The system memory 14 contains PEND REQ table 110 and an INV TRKS table 122. Those two tables could be formed as a single table with one register or position corresponding to each logical volume so that separate skew levels could be established for each such volume.

Alternate Embodiment

Figure 6:
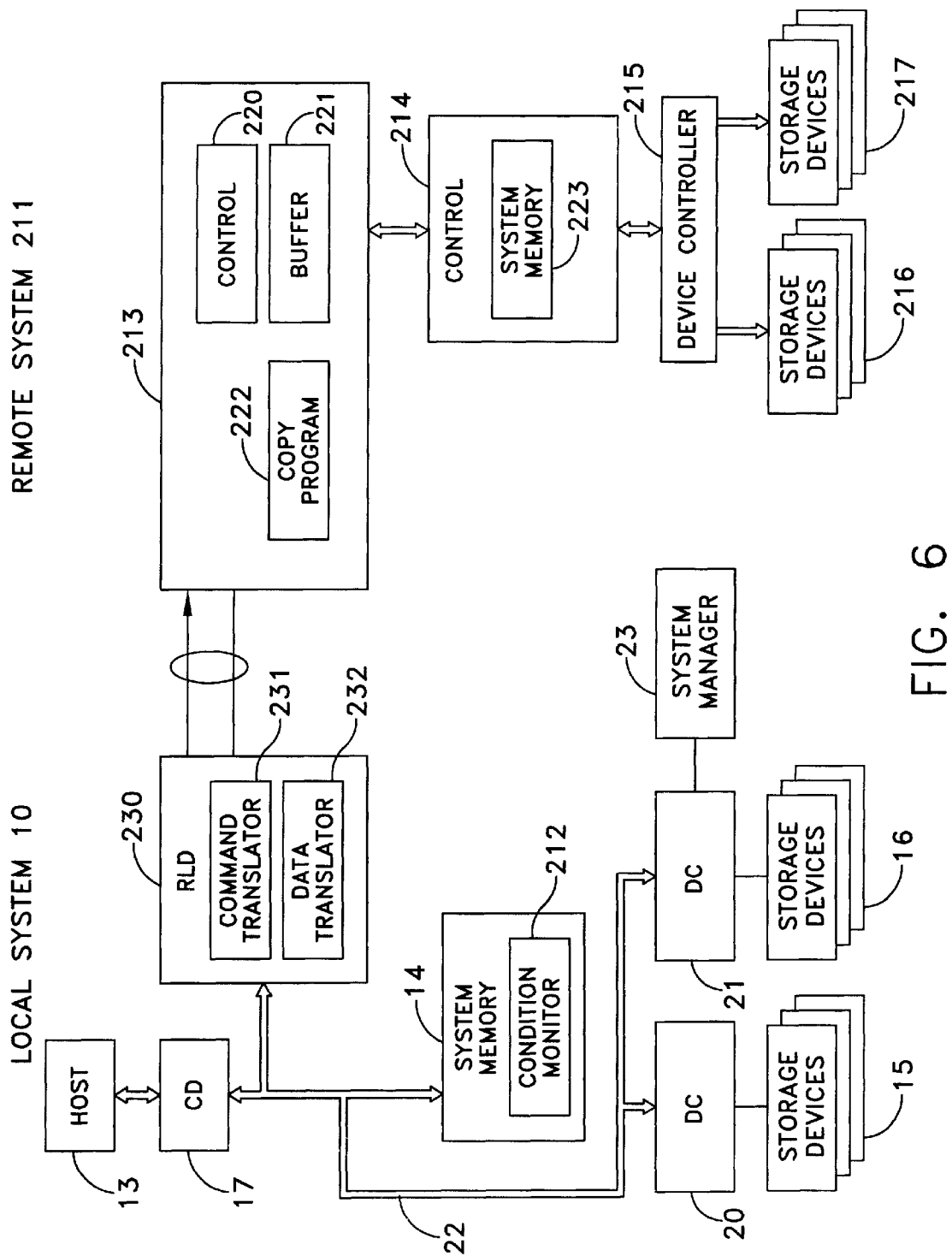
FIG. 6 is a block diagram of another data processing network constructed in accordance with this invention.

The foregoing description of this invention has been in terms of a specific data storage facility construction, namely a Symmetrix integrated cached disk array, in terms of two specific alternate operating modes. This invention is also applicable to systems with other operating modes with reversion and re-enablement dependent upon other conditions. For example, FIG. 6 depicts a local system 10 having the same basic construction as the local system 10 in FIG. 1. That is, local system 10 includes a host system 13 with a system memory 14 and sets 15 and 16 of multiple data storage devices or data stores. A channel director 17 provides communications between the host system 13 and the system memory 14. The device controllers 20 and 21 provide pathways between the system memory 14 and the storage devices 15 and 16. A bus 22 interconnects the system memory 14, the channel directors 17 and 18 and the device controllers 20 and 21. A system manager 23 enables an operator to transfer information between the various elements of the system and serves as one means for initiative a enabling an initial switch to an alternative operating mode.

In connection with this embodiment of the invention, the system memory 14 includes a condition monitor 212 that can monitor predetermined conditions within the remote system 211. The monitoring of the track status block 26 in FIG. 1 during the alternating operating mode is an example of one such condition. Other conditions could include the interval a specific piece of data has been stored in the data storage devices 16 and 17.

The local system 10 in FIG. 6 is also modified to allow operation with remote systems having a construction that is different from the remote system shown in FIG. 1. FIG. 6 depicts a remote system 211 that has a preprocessing section 213, a control 214 and device controllers 215 that control read and write operation with storage devices 216 and 217.

The preprocessor 213 includes its own control 220, a buffer 221 and a copy program 222. The control 214 can include a system memory 223. In operation, the control 220 could respond to the receipt of a request and any data in the buffer of 221 by initiating a copy operation during which the copy program 222 moves data either from the buffer 221 or the system memory 223 to an appropriate one of the storage devices 216 or 217.

If such a preprocessor requires a different request format or a different data format, the interface to such a remote system 211 is provided by a modified remote link director 230 in the local system 10 that has many of the functions of the remote link director 30 of FIG. 1. However, the remote link director will additionally include a command translator 231 and a data translator 232. The command translator 231 converts any commands into a form that was compatible with the control 220 in the remote system 211. The data translator converts data from a format provided by the host 13 to a format compatible with the remote system 211. Such command translators and data translators are well known in the art.

In the system of FIG. 6, a write operation initiated by the host, as an external request generator, will cause the corresponding data to be transferred to system memory 14 and then to one of the storage devices 15 or 16 as in FIG. 1. In this particular embodiment, however, the write commands in the form generated by the channel director 17, will also transfer to the remote link director 230 where the command and data will be translated as necessary to be compatible with the hardware and software that constitutes the remote system 211. The remote system 211 will then load the data into the storage devices 216 and 217. If the alternate operating modes are the same as those described with respect to FIG. 1, then, with the exception of the command translation and data translation functions, the process will be basically the same as that carried out by the network in FIG. 1.

Figure 7:
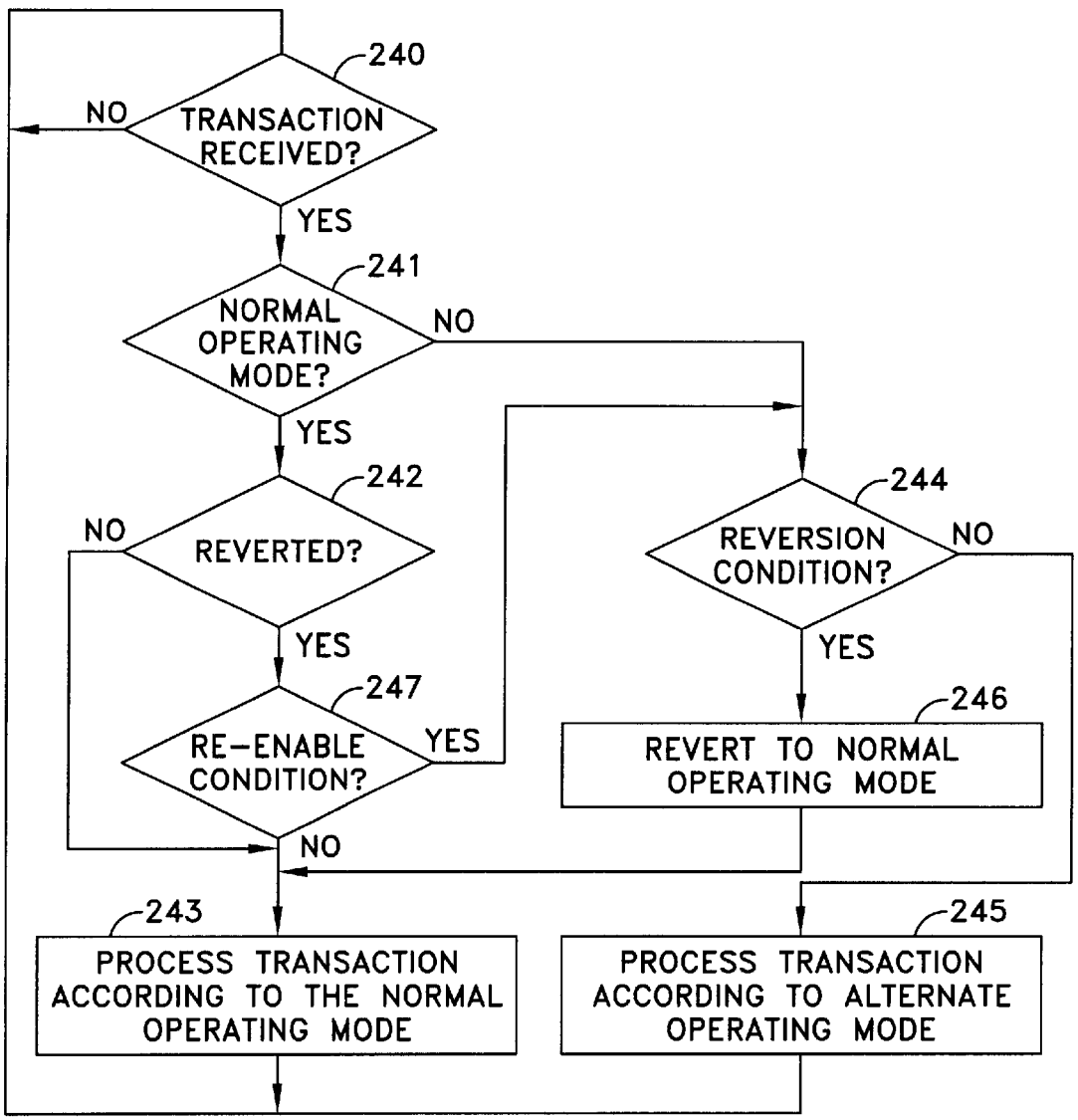
FIG. 7 is a flow diagram that is useful in understanding this invention.

However, other operating modes could be incorporated in such a system. FIG. 7 depicts the operation of such a system particularly at the local system 10 that will respond to any number of conditions in association with an alternate operating mode. Specifically, in FIG. 7 step 240 defines a wait loop for the receipt of a transaction, typically, a write transaction or request. When such a transaction is received, the local system 10 uses step 241 to determine whether it is operating in a normal operating mode. If it is, step 241 diverts control to step 242 to determine if the local system is operating in a normal operating mode because operations previously have been reverted to that mode. At the beginning of a session this will not be the case. So step 242 will transfer control to step 243 to the operation according to the normal operating mode as described in FIGS. 2A through 2C.

If the operator has implemented an alternate operating mode through the system manager 23, step 241 diverts to step 244 to determine whether a reversion condition exist. During a first transaction control generally will pass to step 245 to process the data in accordance with the alternate operating mode.

This operation will continue until conditions warrant a reversion. When this occurs, step 244 transfers control to step 246 that thereupon causes the local system to revert to the normal operating mode and process the transaction in step 243.

During a session it is possible for the condition that caused the reversion to change so that the alternate operating mode can be used again. If such a feature is included, the flow diagram in FIG. 7 will include steps 242 and 247. Whenever a reversion has occurred during a session, step 242 transfers control to step 246. If the condition that caused the reversion in step 246 has ceased to exist, control transfers to step 244 so the data request transfers according to the alternate operating mode.

Still other modifications might be made to interface the data storage facilities to operate with operating systems of other host processors. The flows of FIG. 7 could be modified so the tests of steps 242, 244 and 247 occur after processing, rather than before processing. Any of a myriad of conditions could be monitored. Therefore, it is the intent of the appended claims to cover all such variations and modifications as come within the true spirit and scope of this invention.

What is claimed as new and desired to be secured by Letters Patent of the United States is:

1. A method for transferring data from a first data storage facility through an intersystem transfer path to a second, geographically remote data storage facility wherein each of the data storage facilities includes a data store for storing data in a retrievable form, wherein the first data storage facility includes interface means responsive to externally generated requests for a data transfer and means for determining the quantity of data to be transferred to the second-data storage facility and wherein said method normally transfers the data from the interface means to the first and second data storage facilities according to a normal operating mode, said method comprising the additional steps of:
A) enabling an alternate operating mode and thereby disabling the normal operating mode, and
B) thereafter responding to each request received at the interface means by:
i) transferring the data from the interface means to the data store in the first data storage facility,
ii) transferring the data from the first data storage facility to the second data storage facility; and
iii) monitoring the quantity of data, said monitoring including:
a) establishing a maximum quantity of data to be transferred to the second data storage facility,
b) dynamically monitoring the quantity of data to be transferred to the second data storage facility, and
c) reverting the operation to the normal operating mode when the monitored quantity exceeds the maximum quantity.

2. A method as recited in claim 1 additionally comprising the step of re-enabling the alternate operating mode when the monitored quantity ceases to exceed the maximum quantity.

3. A method as recited in claim 2 wherein the first and second data storage facilities have different characteristics, said method additionally comprising the step of modifying an externally generated request to conform to the characteristics of the second data storage facility.

4. A method as recited in claim 2 wherein the first and second data storage facilities store data with different data formats, said method additionally comprising the step of modifying the format of the data received from the first data storage facility to the format of the data stored in the second data storage facility.

5. A method as recited in claim 2 wherein the externally generated request has a first format and requests for controlling the second data storage facility are different, said method additionally comprising the step of translating each externally generated request to a request that is compatible with the operation of the second data storage facility.

6. A control for effecting a transfer of data from a first data storage facility through an intersystem transfer path to a second, geographically remote data storage facility wherein each of the data storage facilities includes a data store for storing data in a retrievable form, wherein said first data storage facility includes interface means responsive to externally generated requests for a data transfer and a memory that identifies the quantity of data to be transferred to the second data storage facility and wherein said control normally transfers the data from the interface means to the first and second data stage facilities according to a normal operating mode, said control comprising;
A) a mode controller that establishes an alternate operating mode and disables the normal operating mode, and
B) means for transferring the data from the interface means to said data store in said first data storage facility during the alternate operating mode,
C) means for transferring the data from said first data storage facility to the second data storage facility during the alternate operating mode,
D) a monitor operable during the alternate operating mode including:
i) a memory that stores a maximum quantity of data to be awaiting transfer to the second data storage facility, and
ii) a dynamic monitor for determining a monitored quantity of data awaiting transfer to the second data storage facility, and
E) means for reverting the operation to the normal operating mode when said dynamic monitor determines that the monitored quantity exceeds the maximum quantity.

7. A control as recited in claim 6 additionally comprising means for re-enabling the alternate operating mode when the monitored quantity ceases to exceed the maximum quantity.

8. A control as recited in claim 7 wherein said first and the second data storage facilities have different characteristics, said control additionally comprising means for modifying an externally generated request to conform to the characteristics of the second data storage facility.

9. A control as recited in claim 7 wherein said first and the second data storage facilities store data with different data formats, said control additionally comprising a data translator that translates data in the format of said first data storage facility to the format of the second data storage facility.

10. A control as recited in claim 7 wherein the externally generated request has a first format and requests for controlling the second data storage facility have a different format said method additionally comprising a command translator that translates externally generated request to a request that is compatible with the operation of the second data storage facility.

11. A control for effecting a transfer of data from a first data storage facility through an intersystem transfer path to a second, geographically remote data storage facility wherein each of the data storage facilities includes a data store for storing data in a retrievable form, wherein said first data storage facility includes interface means responsive to externally generated requests for a data transfer and a memory that identifies the quantity of data to be transferred to the second data storage facility and transfers data in response to write requests received from the interface means and wherein said control normally transfers the data to the first and second data stage facilities according to a normal operating mode, said control comprising;

A) a mode controller that establishes an alternate operating mode and disables the normal operating mode, and B) means for transferring the data from the interface means to said data store in said first data storage facility during the alternate operating mode, C) means for transferring the data from said first data storage facility to the second data storage facility during the alternate operating mode, D) a monitor operable during the alternate operating mode including:
  i) a memory for a maximum number of pending write requests for the second data storage facility,
  ii) a dynamic monitor that records the number of pending write requests for-transfer to the second data storage facility, said reverting means being enabled when the number of pending write requests exceeds the maximum number of pending write requests, and E) means for reverting the operation to the normal operating mode when the number of pending write requests exceeds the maximum number of pending write requests.

* * * * *